United States Patent [19]
Hattori

[11] Patent Number: 5,954,083
[45] Date of Patent: Sep. 21, 1999

[54] LIQUID FLOW-OUT PREVENTION VALVE

[75] Inventor: Toshio Hattori, Sagamihari, Japan

[73] Assignee: Nifco Inc., Yokohama, Japan

[21] Appl. No.: 09/076,875

[22] Filed: May 13, 1998

[30] Foreign Application Priority Data

May 13, 1997 [JP] Japan .................................. 9-122367

[51] Int. Cl.⁶ ................................................ F16K 24/04
[52] U.S. Cl. ................................................ 137/202; 137/43
[58] Field of Search .................................. 137/43, 202

[56] References Cited

U.S. PATENT DOCUMENTS

| | | | |
|---|---|---|---|
| 4,905,726 | 3/1990 | Kasugai et al. | 137/43 X |
| 4,989,629 | 2/1991 | Shirakawa | 137/202 |
| 5,277,217 | 1/1994 | Kobayashi et al. | 137/202 X |
| 5,522,417 | 6/1996 | Tomioka et al. | 137/202 X |

FOREIGN PATENT DOCUMENTS

| | | |
|---|---|---|
| 6-6983 | 2/1994 | Japan . |
| 6-6984 | 2/1994 | Japan . |

*Primary Examiner*—Gerald A. Michalsky
*Attorney, Agent, or Firm*—Kanesaka & Takeuchi

[57] ABSTRACT

A liquid flow-out prevention valve is basically formed of a cut-off valve and a relief valve attached to the cut-off valve. The cut-off valve includes a housing having an outlet in an upper wall, and a valve body disposed inside the housing to open and close the outlet. A flow path communicating with the outlet extends from above the upper wall to a side wall of the cut-off valve. The relief valve includes a valve portion formed in the flow path at a side of the side wall, and an inlet communicating with the flow path and opened and closed by the valve portion. The inlet is disposed above a liquid level of the cut-off valve in a fuel tank and is arranged to open upwardly. The liquid flow-out prevention valve can be made compact and operate reliably.

7 Claims, 3 Drawing Sheets

5,954,083

LIQUID FLOW-OUT PREVENTION VALVE

BACKGROUND OF THE INVENTION AND RELATED ART STATEMENT

The present invention relates to a liquid flow-out prevention valve or liquid shutoff valve, which is, for example attached to a fuel tank of a vehicle. The valve operates to prevent increase of a pressure in the fuel tank by releasing a fuel vapor in the tank to atmosphere, and to prevent fuel from flowing outside the fuel tank when the vehicle is accelerated, decelerated or turned quickly.

As a conventional liquid flow-out prevention valve, there is a valve having a relief valve with an inlet disposed parallel to an outlet of a cut-off valve formed at an upper part of the cut-off valve, the inlet being connected to a flow path communicating with the outlet, such as disclosed in Japanese Utility Model Publications (KOKOKU) No. 6-6983 and No. 6-6984.

In the liquid flow-out prevention valve disclosed in Japanese Publication No. 6-6983, since the relief valve is formed above the cut-off valve, the height or size of the valve becomes large.

Also, since the inlet of the relief valve orients and opens downwardly, when a vehicle is accelerated, decelerated or turned quickly, fuel flowing into the liquid flow-out prevention valve ascends to provide a large force. This large force opens or lifts up a valve body closing the inlet of the relief valve by a coil spring to open the inlet of the relief valve. Accordingly, fuel in the fuel tank may flow into the flow path.

In the liquid flow-out prevention valve disclosed in Japanese Publication No. 6-6984, a relief valve is disposed beside a cut-off valve to shorten the height or size. However, similar to the valve disclosed in Publication No. 6-6983, since the inlet of the relief valve orients and opens downwardly, when a vehicle is accelerated, decelerated or turned quickly, fuel in the fuel tank may flow into the flow path from the inlet of the relief valve.

The present invention has been made to obviate the above drawbacks, and an object of the invention is to provide a liquid flow-out prevention valve, wherein the height and size of the valve can be reduced.

Another object of the invention is to provide a liquid flow-out prevention valve as stated above, wherein a liquid does not flow into a flow path.

A further object of the invention is to provide a liquid flow-out prevention valve as stated above, wherein an inlet of a relief valve is not clogged by foreign materials.

Further objects and advantages of the invention will be apparent from the following description of the invention.

SUMMARY OF THE INVENTION

In a liquid flow-out prevention valve or liquid shutoff valve of the invention, a flow path communicates with an outlet provided at an upper part of a cut-off valve, and an inlet of a relief valve is disposed parallel to the outlet of the cut-off valve to communicate together. The flow path extends from the upper side or wall of the cut-off valve to a side wall of the cut-off valve, and the relief valve is disposed near the side wall of the cut-off valve so that the inlet of the relief valve is located above a liquid level and is oriented upwardly.

It is preferable to locate the inlet of the relief valve at the uppermost part thereof. Also, it is preferable to provide a cover having an opening to cover the inlet of the relief valve, wherein the diameter of the opening of the cover is made smaller than the diameter of the inlet of the relief valve.

DETAILED DESCRIPTION OF PREFERRED EMBODIMENTS

Figure 1:
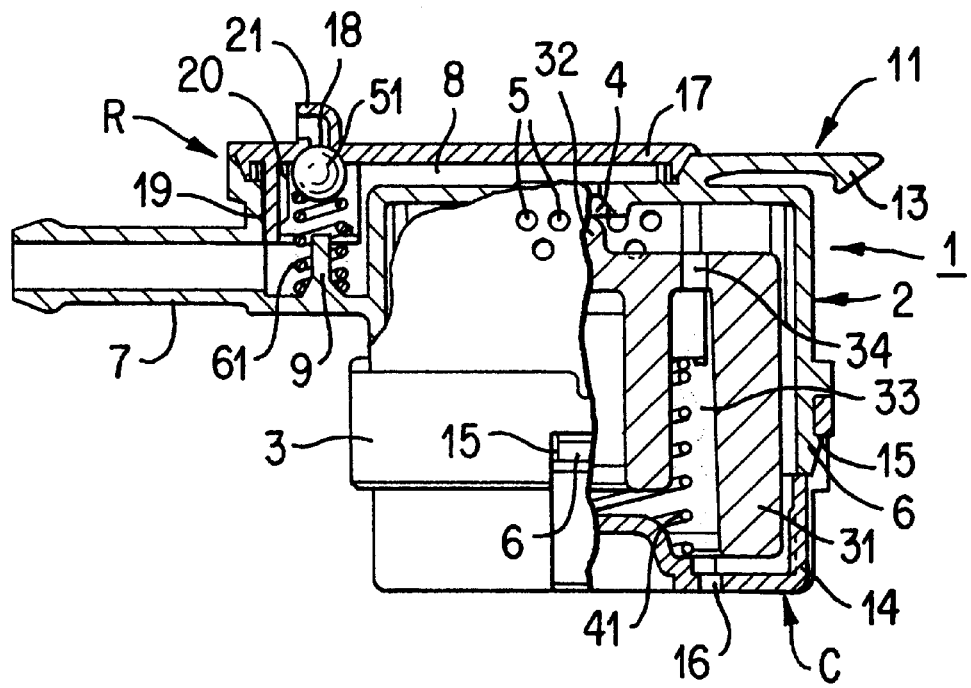
FIG. 1 is a partly cut front view of a liquid flow-out prevention valve of the invention.
Figure 2:
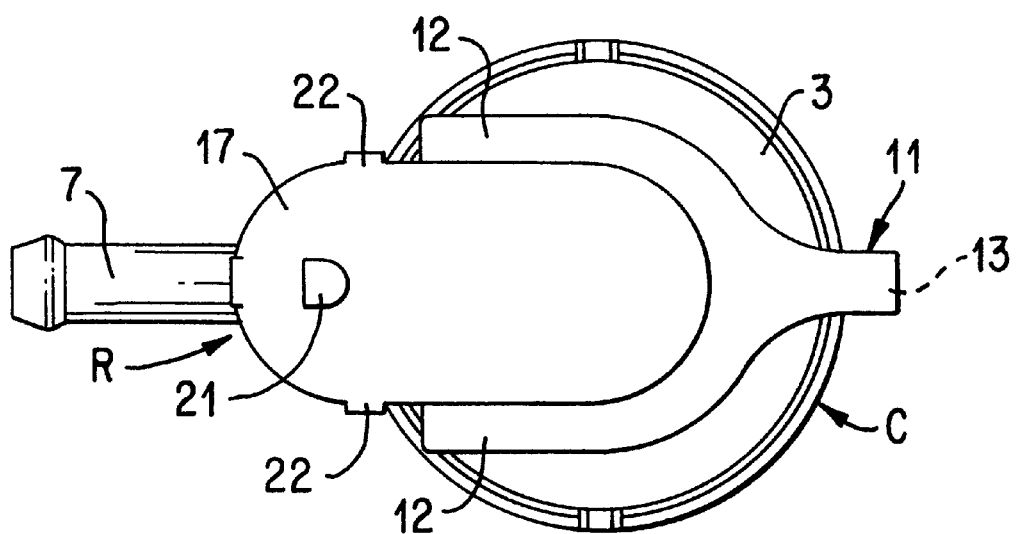
FIG. 2 is a plan view of the liquid flow-out prevention valve shown in FIG. 1 in a condition that the valve is not cut.
Figure 3:
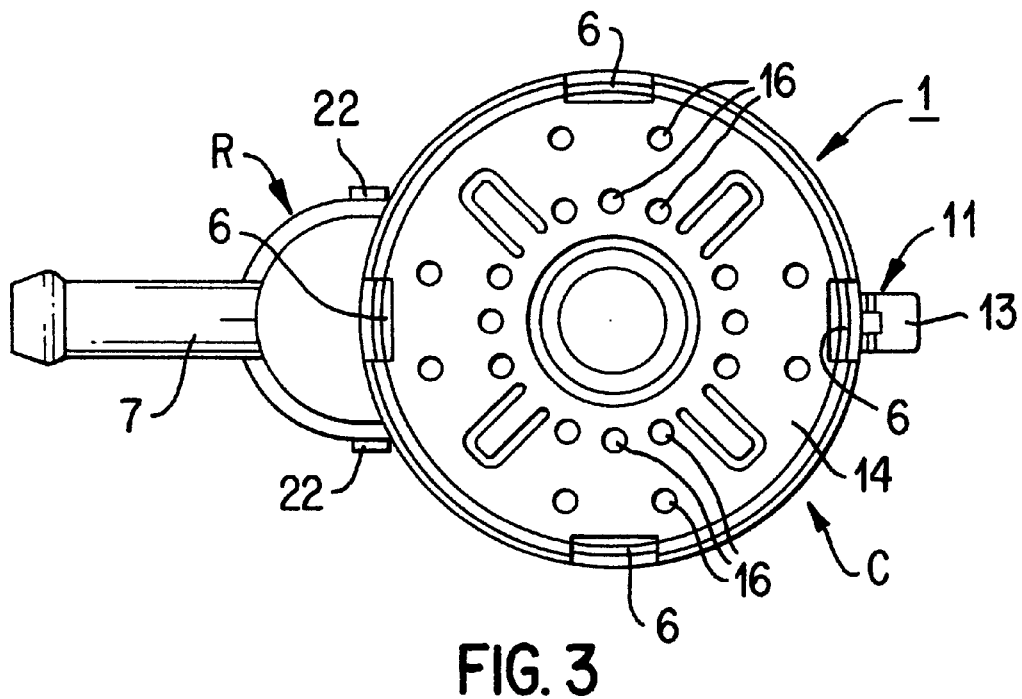
FIG. 3 is a bottom view of the liquid flow-out prevention valve shown in FIG. 1 in a condition that the valve is not cut.
Figure 4:
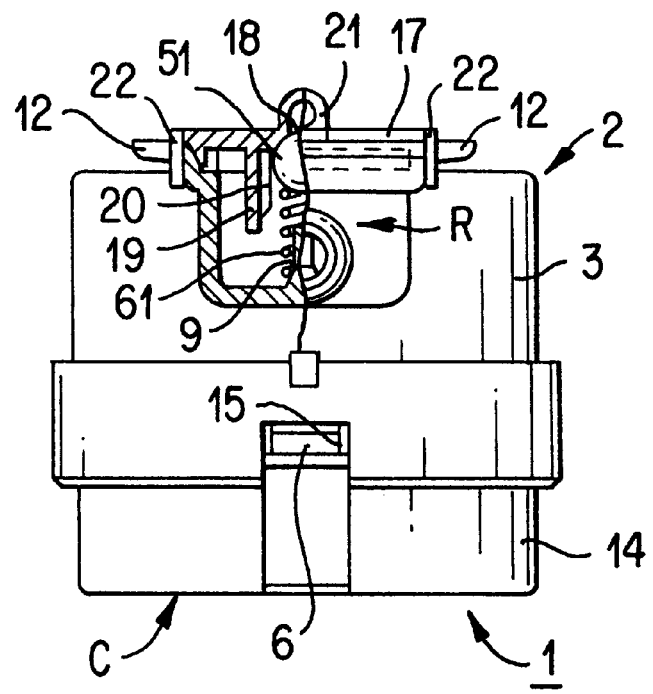
FIG. 4 is left side view of the liquid flow-out prevention valve shown in FIG. 1 in a condition that the valve is not cut and a left side of a relief valve is cut.
Figure 5:
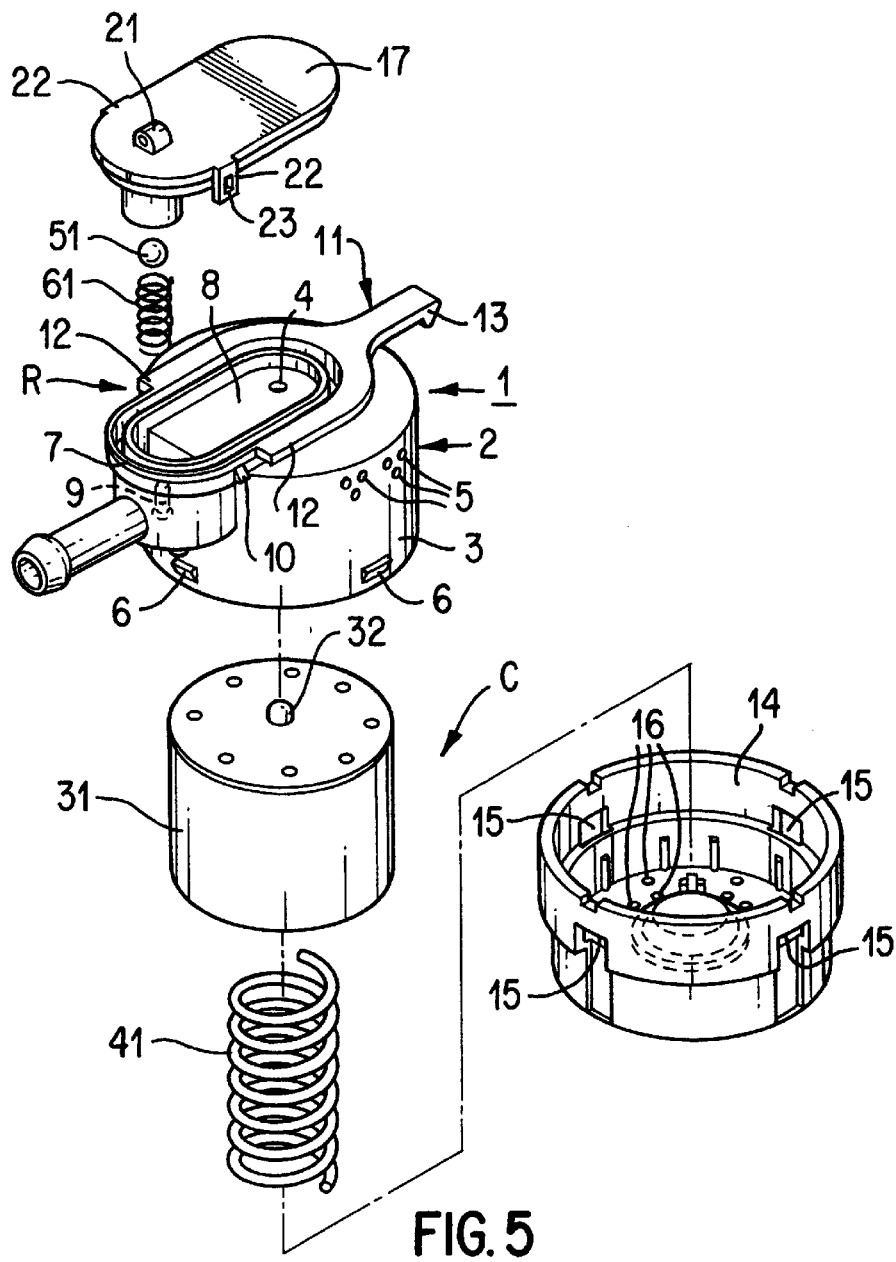
FIG. 5 is an exploded perspective view of the liquid flow-out prevention valve shown in FIG. 1 in a condition that the valve is not cut.
Figure 6:
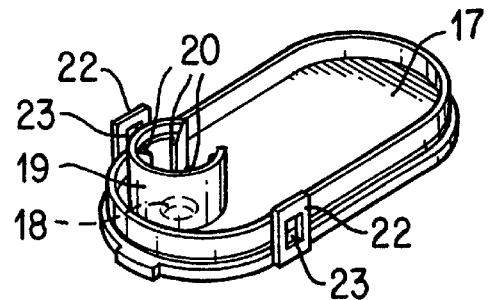
FIG. 6 is a perspective view for showing a shape of a cylindrical guide attached to an upper cap as shown in FIG. 5.

The invention will be explained with reference to the drawings.

In the drawings, numeral 1 shows a housing made of a polyacetal resin, which has sufficient rigidity and is molded accurately in size. The housing 1 includes a housing main body 2 with a partly opened ceiling, a lower cap 14 attached to the main body 2 to cover a lower opening of the main body, and an upper cap 17 attached to the main body to cover an open portion 8 of the main body 2. The lower cap 14 has a cylindrical shape with a bottom, and is made of a polyacetal resin. The upper cap 17 is also made of a polyacetal resin.

The housing main body 2 is formed of a cylindrical portion 3 provided with a circular outlet 4 in the center of the ceiling and a bottom opening, a nipple portion 7 for forming a flow path, and an attaching portion 11 with flanges 12 and an engaging claw 13 formed in the flanges 12. The flow path communicates with the outlet 4, extends from the upper side of the cylindrical portion 3 to a midway outside a side wall, and projects horizontally and radially outwardly of the cylindrical portion 3. The flanges 12 are formed at an upper side of the cylindrical portion 3 near the nipple portion 7, and forms a predetermined clearance with respect to the ceiling of the cylindrical portion 3.

Also, the cylindrical portion 3 is provided with a plurality of circular openings 5 at the upper portion of the side wall for forming a part of an inlet, and lower side cap engaging claws 6 at a lower portion of the side wall. The cap engaging claws 6 are spaced apart from each other with a predetermined interval, e.g. 90 degrees. An upper portion of the nipple portion 7 located at an upper side of the cylindrical portion 3 becomes the open portion 8.

Further, the nipple portion 7 includes a positioning boss 9 located outside the cylindrical portion 3 and disposed on a bottom for a portion communicating with the open portion 8. The positioning boss 9 operates to position one end of a coil spring 61. Also, engaging claws 10 for forming pre-fixing means are formed at the upper portion of the side wall.

The lower cap 14 includes a plurality of engaging holes 15 at the upper portion of a side wall, and a plurality of circular openings 16 for forming a part of the inlet at a bottom thereof. The engaging holes 15 correspond to the plurality of the engaging claws 6, wherein the engaging claws 6 enter into the engaging holes 15 to hold the lower cap 14.

The upper cap 17 includes a circular inlet 18, and a cylindrical guide or hollow guide 19 extending downwardly from the upper cap 17 to surround the inlet 18 and having a cutout with 90 degrees in the axial direction. The cylindrical guide 19 includes a plurality of ribs 20 extending in the axial direction at an inner surface thereof for forming a space with respect to a ball 51 explained later. The upper cap 17 also includes a cylindrical cover or hollow cover 21 surrounding the circular inlet 18, and engaging pieces 22 corresponding to the engaging claws 10 of the nipple portion 7 to form the pre-fixing means. The cylindrical cover 21 extends upwardly from the upper cap 17 and then bends at 90 degrees to form a cover. The engaging piece 22 includes an engaging hole 23, into which the engaging claws 10 enters to engage the upper cap 17 to the housing main body 2.

Numeral 31 designates a valve body made of a polyacetal resin, which can move in the axial direction in the cylindrical portion 3 to open or close the outlet 4. The valve body 31 includes a valve head 32 at an upper portion thereof for opening and closing the outlet 4, a circular depression 33 at a lower portion thereof to extend in the axial direction for receiving a coil spring 41 explained later, and through holes 34 communicating with the depression 33. The through holes 34 extend in the axial direction and open at the upper surface of the valve body 31.

Numeral 41 designates the coil spring as an urging member. The coil spring 41 has an urging force such that it can not close the outlet 4 by moving the valve body 31 against the weight thereof, but it can close the outlet 4 by moving the valve body 31 in cooperation with buoyancy of the valve body 31.

Numeral 51 designates the ball as a valve body, and is made of a polyacetal resin or steel. The ball 51 moves in the axial direction in the cylindrical guide 19 formed in the upper cap 17 to open or close the inlet 18.

Numeral 61 is a coil spring as urging means. When the pressure inside the fuel tank exceeds a predetermined value, the coil spring reduces its size through the ball 51 to thereby open the inlet 18 of the upper cap 17.

A cut-off valve C is formed by the above cylindrical portion 3, the lower cap 14, the valve body 31 and the coil spring 41, while a relief valve R is formed by a part of the nipple portion 7, a part of the upper cap 17, the ball 51 and the coil spring 61. The opening at a lower side of the cylindrical guide 19 and the cutout portion thereof constitute the inlet of the relief valve R.

Incidentally, the diameters of the outlet 4, the opening 5, the opening 16 and the through hole 34 are set such that (diameter of the outlet 4)>(diameter of the opening 16)=(diameter of the through hole 34)>(diameter of the opening 5).

Further, the diameters of the outlet 4, the inlet 18 and the opening of the cylindrical cover 21 are set such that (diameter of the outlet 4)=(diameter of the inlet 18)>(diameter of the opening of the cylindrical cover 21).

Next, one example for assembling the liquid flow-out prevention valve of the invention will be explained.

At first, the coil spring 61 is inserted into the nipple portion 7 through the open portion 8 so that one end of the coil spring 61 is located around the positioning boss 9. After the ball 5 is located on the other end of the coil spring 61, the engaging pieces 22 of the upper cap 17 are aligned to correspond to the engaging claws 10. Then, the upper cap 17 is pressed to allow the ball 51 and the coil spring 61 to enter into the cylindrical guide 19. As a result, the tips of the engaging pieces 22 are enlarged or pushed laterally by the engaging claws 10. As the engaging holes 23 descend to the positions of the engaging claws 10, since the engaging pieces 22 close or return to the original postures by their own flexibility, the engaging claws 10 enter into the engaging holes 23. Thus, in order not to disengage the upper cap 17 from the cylindrical portion 3, the upper cap 17 is prefixed to the cylindrical portion 3, and the open portion 8 is closed by means of the engaging claws 10 and the engaging pieces 22.

Then, the nipple portion 7 and the upper cap 17 are sealingly fixed around the open portion 8 by, for example fuse-bonding.

The open lower side of the cylindrical portion 3 where the nipple portion 7 and the upper cap 17 are fuse-bonded is oriented upwardly, and the valve body 31 is inserted into the cylindrical portion 3 from the side of the valve head 32. After the coil spring 41 is inserted into the depression 33, the engaging holes 15 are aligned to correspond to the engaging claws 6, and the lower cap 41 is pushed. Accordingly, the upper parts of the lower cap 41 are resiliently deformed to ride on the engaging claws 6. As the engaging holes 15 decent to the positions where the engaging claws 6 are located, the engaging claws 6 enter into the engaging holes 15. As a result, the lower cap 14 are fixed to the cylindrical portion 3 by the engaging claws 6. Thus, the assembly is completed.

The liquid flow-out prevention valve assembled as stated above is inserted into the fuel tank such that the flanges 12 on both sides are held by brackets formed at an inner side of a ceiling of the fuel tank (not shown). The engaging claws 13 at the front edge of the flanges 12 engages an engaging portion formed at the inner side of the ceiling of the fuel tank. Accordingly, the liquid flow-out prevention valve can be attached inside the fuel tank.

The operation of the liquid flow-out prevention valve is explained.

First, in the normal condition as shown in FIG. 1 where the liquid flow-out prevention valve is attached to the fuel tank, the valve body 31 is located at the lower position against the urging force of the coil spring 41 by its own weight. Thus, the valve head 32 opens the outlet 4, and the ball 51 closes the inlet 18 by the urging force of the coil spring 61.

Accordingly, the fuel vapor, for example gasoline vapor, generated in the fuel tank flows into the outlet 4 from the openings 5, 16 or from the openings 16, depression 33 and the through holes 34. The vapor from the outlet 4 is ejected to a canister through the nipple portion 7, which is a flow path, so that the increase of the pressure in the fuel tank is prevented.

If the vehicle is accelerated, decelerated or turned quickly to thereby generate a large inertia, gasoline enters into the inside of the cylindrical portion 3 through the openings 5, 16 by the inertia. As a result, the valve body 31 receives buoyancy, but since the specific gravity of the valve body 31 is greater than that of gasoline, the valve body 31 can not move upwardly by itself. However, the valve body 31 receives the urging force from the coil spring 41 to thereby move upwardly, so that the valve head 32 closes the outlet 4.

When the vehicle returns to the normal condition, and gasoline inside the cylindrical portion 3 returns to the fuel tank through the openings 5, 16, the valve body 31 compresses the coil spring 41 by its own weight and moves downwardly. Accordingly, the outlet 4 is opened, as shown in FIG. 1.

Even if gasoline increases outside the cylindrical portion 3 by a large inertia generated when the vehicle is accelerated, decelerated or turned quickly, since the inlet 18 is formed at the uppermost portion to orient upwardly and is covered by the cylindrical cover 21, the ball 51 is not lowered against the urging force of the coil spring 61 to open the inlet 18. Thus, it is possible to prevent gasoline from flowing out from the fuel tank.

In case the lower half of the cylindrical portion 3 is immersed in gasoline to become a condition such that the valve body 31 floats to close the outlet 4 by the valve head, when gasoline evaporates by the atmospheric temperature, the pressure inside the fuel tank increases. If the pressure increases more than a predetermined value, the pressure urges the ball 51 to move downwardly against the urging force of the coil spring 61 to open the inlet 18. Thus, the gasoline vapor flows into the inlet 18 from the opening of the cylindrical cover 21, and is ejected to the canister through the cutout of the cylindrical guide 19 and the flow path at both sides of the cylindrical guide 19.

Then, in case the pressure in the fuel tank is reduced under the predetermined value, the ball 51 closes the inlet 18 by the urging force of the coil spring. Thus, in the condition that the fuel is fully filled in the fuel tank where the valve body closes the outlet 4, it is possible to prevent the pressure in the fuel tank from increasing.

As stated above, in one embodiment of the invention, the nipple portion forming the flow path is formed from the upper side of the cut-off valve C to the side wall of the cut-off valve C, and the relief valve R is situated at the side wall of the cut-off valve. The inlet 18 of the relief valve R is located at the uppermost position thereof and is oriented to open upwardly. Thus, the height is shortened, and gasoline does not enter into the flow path.

Also, the diameters of the outlet 4, the opening 5, the opening 16 and the through hole 34 are set such that (diameter of the outlet 4)>(diameter of the opening 16)=(diameter of the through hole 34)>(diameter of the opening 5). Thus, even if foreign materials enter into the outlet 4 from the openings 5, 16, the outlet 4 is not clogged by the foreign materials. The openings 16 and the through holes 34 are not clogged by the foreign materials entering from the openings 5, and the foreign materials do not accumulate in the housing 2.

Also, the cylindrical cover 21 for covering the inlet 18 is formed such that the diameter of the opening of the cylindrical cover 21 is made smaller than the diameter of the inlet 18. Therefore, even if the foreign materials enter into the inlet 18 through the cylindrical cover 21, the inlet 18 is not clogged by the foreign materials.

Further, the upper cap 17 is pre-fixed to the nipple portion 7 by the pre-fixing means and is fuse-bonded thereto. Thus, the position of the upper cap 17 can be easily set, and the fuse-bonding operation can be easily made with good operability.

In the above embodiment, the inlet 18 of the relief valve R is located at the uppermost position of the liquid flow-out prevention valve. However, in case the inlet 18 is oriented upwardly and is disposed above the liquid level, the similar effects can be obtained.

Also, the cylindrical cover 21 is used for covering the inlet 18, the cover 21 may have a different shape. Even if the cover 21 is not provided, the similar effect can be obtained.

Further, it is needless to say that the pre-fixing means for the upper cap 17 may have different structure as long as it has a structure for pre-fixing. Also, the liquid has been explained as gasoline, but the liquid may be light oil, volatile liquid and so on.

Although the diameters of the outlet 4, the opening 5, the opening 16 and the through hole 34 are set such that (diameter of the outlet 4)>(diameter of the opening 16)=(diameter of the through hole 34)>(diameter of the opening 5), it may be set such that (diameter of the outlet 4)≧(diameter of the opening 16)≧(diameter of the through hole 34)≧(diameter of the opening 5).

Although the diameters of the outlet 4, the inlet 18 and the opening of the cylindrical cover 21 are set such that (diameter of the outlet 4)=(diameter of the inlet 18)>(diameter of the opening of the cylindrical cover 21), it may be set such that (diameter of the outlet 4)≧(diameter of the inlet 18)>(diameter of the opening of the cylindrical cover 21).

In the above case, when the cylindrical cover 21 does not have a cylindrical shape, for example rectangular, the longest length in the section perpendicularly to the axis of the cover is treated as the length or diameter of the opening. In case the cylindrical cover 21 has a dome shape with an opening, the longest length of the opening is treated as the length or diameter of the opening.

As explained above, in the present invention, the nipple portion for forming the flow path extends from the upper portion of the cut-off valve to the side wall of the cut-off valve. Also, the relief valve is disposed near the side wall of the cut-off valve, and the inlet of the relief valve is located above the liquid level of the fuel tank and is oriented upwardly. Thus, the height is shortened, and the liquid does not substantially enter the flow path.

Also, since the inlet of the relief valve is located at the uppermost position of the housing, the liquid does not enter the inlet. Further, since the cylindrical cover for covering the inlet of the relief valve is formed and the diameter of the opening of the cylindrical cover is made smaller than that of the inlet, the liquid does not enter the flow path, and even if foreign materials enter into the opening of the cylindrical cover, the inlet is not clogged by the foreign materials.

While the invention has been explained with reference to the specific embodiments of the invention, the explanation is illustrative and the invention is limited only by the appended claims.

What is claimed is:

1. A liquid flow-out prevention valve, comprising:

a cut-off valve including a housing formed of an upper wall and a side wall and having an outlet in the upper wall, and a valve body disposed inside the housing to open and close the outlet, a nipple portion disposed adjacent to the cut-off valve to form a flow path therein communicating with the outlet, said nipple portion extending along the upper wall and a part of the side wall of the cut-off valve and projecting laterally outwardly from the side wall at a middle portion thereof, and a relief valve attached to the cut-off valve, said relief valve including an upper cap disposed above the upper wall and forming a part of the nipple portion to thereby establish a part of the flow path between the upper wall and the upper cap, a valve portion formed in the flow path at a side of the side wall, an inlet formed in the upper cap at a portion laterally away from the upper wall and disposed above the outlet to orient upwardly, said inlet communicating with the flow path and opened and closed by the valve portion, inlet being disposed above a liquid level of the cut-off valve and a guide portion extending downwardly from the upper cap to at least partly surround the inlet and receiving said valve portion therein, and a spring situated under the valve portion to urge the valve portion toward the inlet to close the inlet so that when a pressure outside the cut-off valve increases, the valve portion is depressed to open the inlet.

2. A liquid flow-out prevention valve according to claim 1, wherein said inlet of the relief valve is located at an uppermost position of the liquid flow-out prevention valve.

3. A liquid flow-out prevention valve according to claim 2, wherein said relief valve further includes a cover portion covering the inlet and having an opening, a diameter of the opening of the cover portion being less than that of the inlet of the relief valve.

4. A fluid flow-out prevention valve according to claim 1, wherein said nipple portion includes a boss at a side away from the side wall for receiving the spring therearound.

5. A liquid flow-out prevention valve according to claim 1, wherein said upper cap includes a plurality of engaging pieces extending downwardly therefrom, and said housing includes a plurality of engaging claws, said upper cap being sealing fixed to the nipple portion when the upper cap is pre-fixed to the nipple portion by the engaging pieces and the engaging claws.

6. A liquid flow-out prevention valve according to claim 1, wherein said guide portion is located in the flow path and has a cylindrical shape with a cutout at one side thereof.

7. A liquid flow-out prevention valve according to claim 6, wherein said guide portion includes a plurality of ribs at an inner surface thereof to form a space between the guide portion and the valve portion.

* * * * *